(12) United States Patent
Lloyd et al.

(10) Patent No.: US 8,864,901 B2
(45) Date of Patent: Oct. 21, 2014

(54) CALCIUM SULFOALUMINATE CEMENT-CONTAINING INORGANIC POLYMER COMPOSITIONS AND METHODS OF MAKING SAME

(75) Inventors: Redmond Richard Lloyd, Wollongong (AU); Louise Margaret Keyte, Wollongong (AU); Russell L. Hill, San Antonio, TX (US); Zhaozhou Zhang, Shanghai (CN); Mark Hollett, San Antonio, TX (US); Li Ai, San Antonio, TX (US)

(73) Assignee: Boral IP Holdings (Australia) Pty Limited, Sydney (AU)

( * ) Notice: Subject to any disclaimer, the term of this patent is extended or adjusted under 35 U.S.C. 154(b) by 310 days.

(21) Appl. No.: 13/307,188

(22) Filed: Nov. 30, 2011

(65) Prior Publication Data

US 2013/0133554 A1      May 30, 2013

(51) Int. Cl.
*C04B 7/32*  (2006.01)
*C04B 18/08*  (2006.01)
*C04B 24/06*  (2006.01)

(52) U.S. Cl.
USPC ........... 106/692; 106/705; 106/724; 106/728; 106/819; 106/823

(58) Field of Classification Search
CPC ........ C04B 7/32; C04B 12/005; C04B 18/08; C04B 24/06
USPC .................. 106/692, 705, 724, 728, 819, 823
See application file for complete search history.

(56) References Cited

U.S. PATENT DOCUMENTS

| | | |
|---|---|---|
| 1,942,770 A | 1/1934 | Peffer et al. |
| 3,056,724 A | 10/1962 | Marston |
| 3,353,954 A | 11/1967 | Williams |
| 3,497,367 A | 2/1970 | Gaskin et al. |
| 3,854,968 A | 12/1974 | Minnick et al. |
| 4,088,804 A | 5/1978 | Cornwell et al. |
| 4,088,808 A | 5/1978 | Cornwell et al. |
| 4,131,474 A | 12/1978 | Uchikawa et al. |
| 4,177,232 A | 12/1979 | Day |
| 4,190,454 A | 2/1980 | Yamagisi et al. |
| 4,256,500 A | 3/1981 | Turpin, Jr. |

(Continued)

FOREIGN PATENT DOCUMENTS

| | | |
|---|---|---|
| AU | 23988/84 | 2/1984 |
| AU | 611478 | 6/1991 |

(Continued)

OTHER PUBLICATIONS

Davidovits, J., Geopolymer chemistry and applications, Chapter 22: Foamed Geopolymer, p. 471-478.

(Continued)

*Primary Examiner* — Paul Marcantoni
(74) *Attorney, Agent, or Firm* — Joel T. Charlton

(57) ABSTRACT

Inorganic polymer compositions and methods for their preparation are described herein. The compositions include the reaction product of a reactive powder, an activator, and optionally a retardant. The reactive powder includes fly ash, calcium sulfoaluminate cement, and less than 10% by weight portland cement. In some examples, the composition is substantially free from alkanolamines. In some examples, the ratio of water to reactive powder is from 0.06:1 to less than 0.2:1. Also described herein are building materials including the compositions.

32 Claims, 1 Drawing Sheet

(56) References Cited

U.S. PATENT DOCUMENTS

| | | |
|---|---|---|
| 4,256,504 A | 3/1981 | Dunstan, Jr. |
| 4,278,468 A | 7/1981 | Selbe et al. |
| 4,313,763 A | 2/1982 | Turpin, Jr. |
| 4,350,533 A | 9/1982 | Galer et al. |
| 4,357,166 A | 11/1982 | Babcock |
| 4,440,800 A | 4/1984 | Morton et al. |
| 4,488,909 A | 12/1984 | Galer et al. |
| 4,494,990 A | 1/1985 | Harris |
| 4,640,715 A | 2/1987 | Heitzmann et al. |
| 4,642,137 A | 2/1987 | Heitzmann et al. |
| 4,741,782 A | 5/1988 | Styron |
| 4,842,649 A | 6/1989 | Heitzmann et al. |
| 4,892,586 A | 1/1990 | Watanabe et al. |
| 4,933,013 A | 6/1990 | Sakai et al. |
| 4,997,484 A | 3/1991 | Gravitt et al. |
| 5,106,422 A | 4/1992 | Bennett et al. |
| 5,108,679 A | 4/1992 | Rirsch et al. |
| 5,177,444 A | 1/1993 | Cutmore |
| 5,188,064 A | 2/1993 | House |
| 5,192,366 A | 3/1993 | Nishioka et al. |
| 5,207,830 A | 5/1993 | Cowan et al. |
| 5,309,690 A | 5/1994 | Symons |
| 5,337,824 A | 8/1994 | Cowan |
| 5,366,547 A | 11/1994 | Brabston et al. |
| 5,368,997 A | 11/1994 | Kawamoto |
| 5,369,369 A | 11/1994 | Cutmore |
| 5,372,640 A | 12/1994 | Schwarz et al. |
| 5,374,308 A | 12/1994 | Kirkpatrick et al. |
| 5,383,521 A | 1/1995 | Onan et al. |
| 5,387,283 A | 2/1995 | Kirkpatrick et al. |
| 5,435,843 A | 7/1995 | Roy et al. |
| 5,439,518 A | 8/1995 | Francis et al. |
| 5,453,310 A | 9/1995 | Andersen et al. |
| 5,484,480 A | 1/1996 | Styron |
| 5,489,334 A | 2/1996 | Kirkpatrick et al. |
| 5,490,889 A | 2/1996 | Kirkpatrick et al. |
| 5,522,986 A | 6/1996 | Shi et al. |
| 5,536,310 A | 7/1996 | Brook et al. |
| 5,545,297 A | 8/1996 | Andersen et al. |
| 5,556,458 A | 9/1996 | Brook et al. |
| 5,568,895 A | 10/1996 | Webb et al. |
| 5,601,643 A | 2/1997 | Silverstrim et al. |
| 5,624,489 A | 4/1997 | Fu et al. |
| 5,624,491 A | 4/1997 | Liskowitz et al. |
| 5,634,972 A | 6/1997 | Pacanovsky et al. |
| 5,681,384 A | 10/1997 | Liskowitz et al. |
| 5,693,137 A | 12/1997 | Styron |
| 5,704,972 A | 1/1998 | Ivkovich |
| 5,714,002 A | 2/1998 | Styron |
| 5,714,003 A | 2/1998 | Styron |
| 5,718,757 A | 2/1998 | Guillou et al. |
| 5,718,857 A | 2/1998 | Howlett |
| 5,728,209 A | 3/1998 | Bury et al. |
| 5,770,416 A | 6/1998 | Lihme et al. |
| 5,772,752 A | 6/1998 | Liskowitz et al. |
| 5,820,668 A | 10/1998 | Comrie |
| 5,853,475 A | 12/1998 | Liskowitz et al. |
| 5,965,117 A | 10/1999 | Howard, Jr. et al. |
| 5,976,240 A | 11/1999 | Vezza |
| 5,997,632 A | 12/1999 | Styron |
| 6,007,618 A | 12/1999 | Norris et al. |
| 6,008,275 A | 12/1999 | Moreau et al. |
| 6,143,069 A | 11/2000 | Brothers et al. |
| 6,153,673 A | 11/2000 | Lemos et al. |
| 6,241,815 B1 | 6/2001 | Bonen |
| 6,251,178 B1 | 6/2001 | Styron |
| 6,264,740 B1 | 7/2001 | McNulty, Jr. |
| 6,287,550 B1 | 9/2001 | Trinh et al. |
| 6,346,146 B1 | 2/2002 | Duselis et al. |
| 6,443,258 B1 | 9/2002 | Putt et al. |
| 6,482,258 B2 | 11/2002 | Styron |
| 6,486,095 B1 | 11/2002 | Fujita et al. |
| 6,502,636 B2 | 1/2003 | Chatterji et al. |
| 6,554,894 B2 | 4/2003 | Styron et al. |
| 6,555,199 B1 | 4/2003 | Jenkines |
| 6,572,698 B1 | 6/2003 | Ko |
| 6,620,487 B1 | 9/2003 | Tonyan et al. |
| 6,629,413 B1 | 10/2003 | Wendt et al. |
| 6,641,658 B1 | 11/2003 | Dubey |
| 6,676,744 B2 | 1/2004 | Merkley et al. |
| 6,676,745 B2 | 1/2004 | Merkley et al. |
| 6,703,350 B2 | 3/2004 | Fujita et al. |
| 6,706,774 B2 | 3/2004 | Munzenberger et al. |
| 6,740,155 B1 | 5/2004 | Boggs et al. |
| 6,773,500 B1 | 8/2004 | Creamer et al. |
| 6,783,799 B1 | 8/2004 | Goodson |
| 6,786,966 B1 | 9/2004 | Johnson et al. |
| 6,797,674 B2 | 9/2004 | Kato et al. |
| 6,797,676 B2 | 9/2004 | Von Krosigk |
| 6,802,898 B1 | 10/2004 | Liskowitz et al. |
| 6,803,033 B2 | 10/2004 | McGee et al. |
| 6,805,740 B2 | 10/2004 | Canac et al. |
| 6,817,251 B1 | 11/2004 | Sowerby et al. |
| 6,827,776 B1 | 12/2004 | Boggs et al. |
| 6,831,118 B2 | 12/2004 | Munzenberger |
| 6,858,074 B2 | 2/2005 | Anderson et al. |
| 6,869,474 B2 | 3/2005 | Perez-Pena et al. |
| 6,904,971 B2 | 6/2005 | Brothers et al. |
| 6,923,857 B2 | 8/2005 | Constantinou et al. |
| 7,101,430 B1 | 9/2006 | Pike et al. |
| 7,219,733 B2 | 5/2007 | Luke et al. |
| 7,255,739 B2 | 8/2007 | Brothers et al. |
| 7,273,099 B2 | 9/2007 | East, Jr. et al. |
| 7,281,581 B2 | 10/2007 | Nguyen et al. |
| 7,288,148 B2 | 10/2007 | Hicks et al. |
| 7,294,193 B2 | 11/2007 | Comrie |
| 7,296,625 B2 | 11/2007 | East, Jr. |
| 7,318,473 B2 | 1/2008 | East, Jr. et al. |
| 7,325,608 B2 | 2/2008 | van Batenburg et al. |
| 7,334,635 B2 | 2/2008 | Nguyen |
| 7,344,592 B2 | 3/2008 | Setliff et al. |
| 7,347,896 B2 | 3/2008 | Harrison |
| 7,393,886 B2 | 7/2008 | Bandoh et al. |
| 7,442,248 B2 | 10/2008 | Timmons |
| 7,455,798 B2 | 11/2008 | Datta et al. |
| 7,459,421 B2 | 12/2008 | Bullis et al. |
| 7,462,236 B2 | 12/2008 | Chun et al. |
| 7,497,904 B2 | 3/2009 | Dulzer et al. |
| 7,572,485 B2 | 8/2009 | Sandor |
| 7,651,564 B2 | 1/2010 | Francis |
| 7,670,427 B2 | 3/2010 | Perez-Pena et al. |
| 7,691,198 B2 | 4/2010 | Van Deventer et al. |
| 7,708,825 B2 | 5/2010 | Sun et al. |
| 7,727,327 B2 | 6/2010 | Glessner et al. |
| 7,727,330 B2 | 6/2010 | Ordonez et al. |
| 7,732,032 B2 | 6/2010 | Dubey |
| 7,771,686 B2 | 8/2010 | Sagoe-crentsil et al. |
| 7,794,537 B2 | 9/2010 | Barlet-Gouedard et al. |
| 7,799,128 B2 | 9/2010 | Guynn et al. |
| 7,837,787 B2 | 11/2010 | De La Roij |
| 7,846,250 B2 | 12/2010 | Barlet-Gouedard et al. |
| 7,854,803 B1 | 12/2010 | Kirkpatrick et al. |
| 7,863,224 B2 | 1/2011 | Keys et al. |
| 7,878,026 B2 | 2/2011 | Datta et al. |
| 7,883,576 B2 | 2/2011 | Comrie |
| 7,892,351 B1 | 2/2011 | Kirkpatrick et al. |
| 7,897,648 B2 | 3/2011 | Halimaton |
| 8,002,889 B2 | 8/2011 | Drochon et al. |
| 8,007,584 B2 | 8/2011 | Garuti, Jr. et al. |
| 8,016,937 B2 | 9/2011 | Schumacher et al. |
| 8,016,960 B2 | 9/2011 | Wittbold et al. |
| 8,030,377 B2 | 10/2011 | Dubey et al. |
| 8,038,789 B2 | 10/2011 | Boxley |
| 8,038,790 B1 | 10/2011 | Dubey et al. |
| 8,053,498 B2 | 11/2011 | Wieland et al. |
| 8,057,594 B2 | 11/2011 | Doyoyo et al. |
| 8,057,915 B2 | 11/2011 | Song et al. |
| 8,061,257 B2 | 11/2011 | Tonyan et al. |
| 8,070,878 B2 | 12/2011 | Dubey |
| 8,079,198 B2 | 12/2011 | Tonyan et al. |
| 8,088,218 B2 | 1/2012 | Blackburn et al. |
| 8,092,593 B2 | 1/2012 | McCombs |
| 8,093,315 B2 | 1/2012 | Bell et al. |
| 8,122,679 B2 | 2/2012 | Tonyan et al. |

(56) References Cited

U.S. PATENT DOCUMENTS

| | | |
|---|---|---|
| 8,127,849 B2 | 3/2012 | Gupta |
| 8,129,461 B2 | 3/2012 | Xenopoulos et al. |
| 8,133,352 B2 | 3/2012 | Merkley et al. |
| 8,167,994 B2 | 5/2012 | Birch |
| 8,172,940 B2 | 5/2012 | Boxley et al. |
| 8,186,106 B2 | 5/2012 | Schumacher et al. |
| 2002/0017224 A1 | 2/2002 | Horton |
| 2003/0041785 A1 | 3/2003 | Harrison |
| 2003/0056696 A1 | 3/2003 | Fenske et al. |
| 2003/0127025 A1 | 7/2003 | Orange et al. |
| 2004/0149174 A1 | 8/2004 | Farrington et al. |
| 2005/0005869 A1 | 1/2005 | Fritter et al. |
| 2005/0005870 A1 | 1/2005 | Fritter et al. |
| 2005/0075497 A1 | 4/2005 | Utz et al. |
| 2005/0118130 A1 | 6/2005 | Utz et al. |
| 2005/0129643 A1 | 6/2005 | Lepilleur et al. |
| 2005/0175577 A1 | 8/2005 | Jenkins et al. |
| 2005/0197422 A1 | 9/2005 | Mayadunne et al. |
| 2006/0008402 A1 | 1/2006 | Robles |
| 2006/0096166 A1 | 5/2006 | Brooks et al. |
| 2006/0144005 A1 | 7/2006 | Tonyan et al. |
| 2006/0201394 A1 | 9/2006 | Kulakofsky et al. |
| 2006/0201395 A1 | 9/2006 | Barger et al. |
| 2006/0243169 A1 | 11/2006 | Mak et al. |
| 2006/0292358 A1 | 12/2006 | Robertson et al. |
| 2007/0039515 A1 | 2/2007 | Bandoh et al. |
| 2007/0053821 A1 | 3/2007 | Gillman et al. |
| 2007/0125272 A1 | 6/2007 | Johnson |
| 2007/0221100 A1 | 9/2007 | Kumar et al. |
| 2007/0294974 A1 | 12/2007 | Tonyan et al. |
| 2008/0022940 A1 | 1/2008 | Kirsch et al. |
| 2008/0029039 A1 | 2/2008 | Jenkins |
| 2008/0132632 A1 | 6/2008 | Schiraldi et al. |
| 2008/0184939 A1 | 8/2008 | Fritter et al. |
| 2008/0196629 A1 | 8/2008 | Yamakawa et al. |
| 2008/0236450 A1 | 10/2008 | Bonafous et al. |
| 2008/0251027 A1 | 10/2008 | Kirsch et al. |
| 2008/0271641 A1 | 11/2008 | Ko et al. |
| 2008/0289542 A1 | 11/2008 | Ko et al. |
| 2008/0308045 A1 | 12/2008 | Fritter et al. |
| 2008/0310247 A1 | 12/2008 | Basaraba |
| 2009/0007852 A1 | 1/2009 | Fritter et al. |
| 2009/0036573 A1 | 2/2009 | Mita et al. |
| 2009/0130452 A1 | 5/2009 | Surace et al. |
| 2009/0184058 A1 | 7/2009 | Douglas |
| 2009/0217844 A1 | 9/2009 | Ordonez et al. |
| 2009/0217882 A1 | 9/2009 | Jenkins |
| 2009/0255668 A1 | 10/2009 | Fleming et al. |
| 2009/0255677 A1 | 10/2009 | Bryant et al. |
| 2009/0306251 A1 | 12/2009 | Francis |
| 2009/0318571 A1 | 12/2009 | Utz et al. |
| 2010/0071597 A1 | 3/2010 | Perez-Pena |
| 2010/0101457 A1 | 4/2010 | Surace et al. |
| 2010/0126350 A1 | 5/2010 | Sharma |
| 2010/0242803 A1 | 9/2010 | Glessner, Jr. et al. |
| 2010/0247937 A1 | 9/2010 | Liu et al. |
| 2011/0003904 A1 | 1/2011 | Guevara et al. |
| 2011/0028607 A1 | 2/2011 | Morgan et al. |
| 2011/0073311 A1 | 3/2011 | Porcherie et al. |
| 2011/0088598 A1 | 4/2011 | Lisowski et al. |
| 2011/0192100 A1 | 8/2011 | Tonyan et al. |
| 2011/0250440 A1 | 10/2011 | Goodson |
| 2011/0259245 A1 | 10/2011 | Sperisen et al. |
| 2011/0269875 A1 | 11/2011 | Nicoleau et al. |
| 2011/0271876 A1 | 11/2011 | Alter et al. |
| 2011/0283921 A1 | 11/2011 | Schumacher et al. |
| 2011/0283922 A1 | 11/2011 | Schumacher et al. |
| 2011/0284223 A1 | 11/2011 | Porcherie et al. |
| 2011/0287198 A1 | 11/2011 | Song et al. |
| 2011/0290153 A1 | 12/2011 | Abdullah et al. |
| 2012/0024196 A1 | 2/2012 | Gong et al. |
| 2012/0024198 A1 | 2/2012 | Schwartzentruber et al. |
| 2012/0037043 A1 | 2/2012 | Zubrod |
| 2012/0040165 A1 | 2/2012 | Dubey |
| 2012/0111236 A1 | 5/2012 | Constantz et al. |
| 2012/0167804 A1 | 7/2012 | Perez-Pena |
| 2012/0172469 A1 | 7/2012 | Perez-Pena |
| 2013/0087076 A1* | 4/2013 | Hill et al. ............... 106/695 |
| 2013/0087077 A1 | 4/2013 | Hill et al. |
| 2013/0087078 A1 | 4/2013 | Hill et al. |
| 2013/0087079 A1 | 4/2013 | Hill et al. |
| 2013/0087939 A1 | 4/2013 | Hill et al. |
| 2013/0133555 A1 | 5/2013 | Lloyd et al. |

FOREIGN PATENT DOCUMENTS

| | | |
|---|---|---|
| AU | 630892 | 11/1992 |
| AU | 738043 | 11/1997 |
| AU | 718757 | 4/2000 |
| AU | 200040871 | 9/2000 |
| AU | 2005202108 | 12/2005 |
| AU | 2005248952 | 12/2005 |
| AU | 2007200076 | 1/2007 |
| AU | 2007200162 | 10/2007 |
| AU | 2007347758 | 9/2008 |
| AU | 2007347756 | 1/2009 |
| GB | 867328 | 5/1961 |
| JP | 2004091230 | 3/2004 |
| KR | 20010090026 | 10/2001 |
| KR | 20070051111 | 5/2007 |
| WO | 8804285 | 6/1988 |
| WO | 2008130107 | 10/2008 |
| WO | 2009005205 | 1/2009 |
| WO | 2010074811 | 7/2010 |
| WO | 2011026723 | 3/2011 |
| WO | 2011038459 | 4/2011 |
| WO | 2011096925 | 8/2011 |
| WO | 2012142547 | 10/2012 |
| WO | 2013066561 | 10/2013 |
| WO | 2013052732 | 11/2013 |

OTHER PUBLICATIONS

"Effect of Mixing Time on Properties of Concrete." Technology Blog.Oct. 16, 2010 [Retrieved on May 31, 2013]. Retrieved from http://web.archive.org/web/20101016235150/http://civil-engg-world.blogspot.com/2008/12/effect-of-mixing-time-on-properties-of.html.

"Dry Cast vs. Wet Cast." Edward's Cast Stone Company. Feb. 12, 2010 [Retrieved on May 31, 2013]. Retrieved from http://web.archive.org/web/20100212132704/http://www.edwardscaststone.com/products_drywet.cfm.

E. Revertegat, C. Richet, & P. Gégout, "Effect of pH on the Durability of Cement Pastes," Cement &Concrete Res., vol. 22: pp. 259-272 (1992).

Non-Final Office Action mailed Nov. 2, 2012, in U.S. Appl. No. 13/268,011.

Advisory Action mailed Jul. 26, 2013, in U.S. Appl. No. 13/267,967.

Final Office Action mailed Apr. 5, 2013, in U.S. Appl. No. 13/267,967.

Non-Final Office Action mailed Nov. 2, 2013, in U.S. Appl. No. 13/267,967.

Non-Final Office Action mailed Oct. 30, 2012, in U.S. Appl. No. 13/307,504.

Non-Final Office Action mailed May 30, 2013, in U.S. Appl. No. 13/268,211.

Final Office Action mailed May 9, 2013, in U.S. Appl. No. 13/267,969.

Non-Final Office Action mailed Nov. 6, 2012, in U.S. Appl. No. 13/267,969.

Non-Final Office Action mailed Dec. 6, 2013, in U.S. Appl. No. 13/646,060.

Non-Final Office Action mailed Feb. 12, 2014, in U.S. Appl. No. 13/269,283.

International Search Report and Written Opinion, mailed Feb. 15, 2013, in International Patent Application No. PCT/US2012/058847.

International Search Report and Written Opinion, mailed Feb. 26, 2013, in International Patent Application No. PCT/US2012/058852.

* cited by examiner

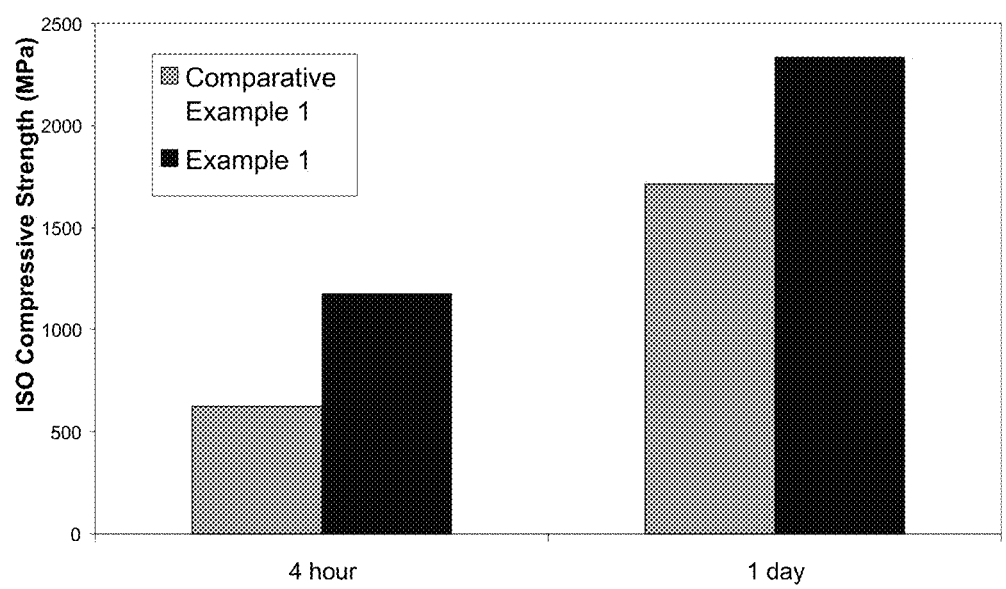

CALCIUM SULFOALUMINATE CEMENT-CONTAINING INORGANIC POLYMER COMPOSITIONS AND METHODS OF MAKING SAME

BACKGROUND

Certain building materials can be prepared from cementitious mixtures based on portland cement and can contain additives to enhance the properties of the materials. Fly ash is used in cementitious mixtures to provide enhanced durability and reduced permeability of the cementitious products. In addition to imparting improved performance properties, the use of fly ash is desirable because it is a recyclable product and would otherwise be a waste material. Furthermore, fly ash is less expensive than portland cement. Thus, there is a desire to provide high strength building products that are based on fly ash.

SUMMARY

Inorganic polymer compositions and methods for their preparation are described. In some embodiments, the inorganic polymers include the reaction product of reactive powder, an activator, and optionally a retardant. In these embodiments, the reactive powder includes fly ash, calcium sulfoaluminate cement, and less than 10% by weight portland cement and the composition is substantially free from alkanolamines. The inorganic polymers can further comprise water. In some examples, the ratio of water to reactive powder is from 0.09:1 to less than 0.2:1.

In some embodiments, the inorganic polymers include the reaction product of reactive powder, an activator, optionally a retardant, and water. In these embodiments, the reactive powder includes fly ash and calcium sulfoaluminate cement. The ratio of water to reactive powder is from 0.06:1 to less than 0.2:1. In some examples, the water to reactive powder ratio of the inorganic compositions described herein can be from 0.06:1 to less than 0.17:1 (e.g., from 0.06:1 to less than 0.15:1 or from 0.06:1 to less than 0.14:1).

The fly ash can be present in an amount of greater than 85% by weight of the reactive powder (e.g., greater than 90% by weight or greater than 95% by weight). In some examples, the fly ash includes a calcium oxide content of from 18% to 35% by weight (e.g., from 23% to 30% by weight). The fly ash present in the reactive powder can include Class C fly ash. In some examples, greater than 75%, greater than 85%, or greater than 95% of the fly ash comprises Class C fly ash. The reactive powder can further include portland cement. For example, the reactive powder can include 5% by weight or less, 3% by weight or less, or 1% by weight or less of portland cement. In some examples, the reactive powder is substantially free from portland cement. The reactive powder further includes calcium sulfoaluminate cement. The calcium sulfoaluminate cement can be present, for example, in an amount of from 1% to 5% of the reactive powder. Optionally, the reactive powder can further include calcium aluminate cement.

In some embodiments, the activator used to prepare the inorganic polymers can include citric acid and/or sodium hydroxide. In some examples, the activator is present in an amount of from 1.5% to 8.5% based on the weight of the reactive powder. Optionally, a retardant (e.g., borax, boric acid, gypsum, phosphates, gluconates, or a mixture of these) is included in the composition. The retardant can be present, for example, in an amount of from 0.4% to 7.5% based on the weight of the reactive powder. In some examples, the composition is substantially free from retardants.

The inorganic polymer compositions can further include aggregate, such as lightweight aggregate. The compositions can further include water, a water reducer, a plasticizer (e.g., clay or a polymer), a pigment, or a blowing agent.

Also described are building materials including the compositions described herein. The building materials can be, for example, roofing tiles, ceramic tiles, synthetic stone, thin bricks, bricks, pavers, panels, or underlay.

Further described is a method of producing an inorganic polymer composition, which includes mixing reactants comprising a reactive powder, an activator, and optionally a retardant in the presence of water and allowing the reactants to react to form the inorganic polymer composition. In this method, the reactive powder comprises fly ash, calcium sulfoaluminate cement, and less than 10% by weight portland cement and the composition is substantially free from alkanolamines. In some examples, the reactants are mixed for a period of 15 seconds or less. The mixing can be performed, for example, at ambient temperature.

In some examples, the activator includes citric acid and sodium hydroxide. Optionally, the citric acid and sodium hydroxide are combined prior to mixing with the reactants. The weight ratio of the citric acid to sodium hydroxide can be from 0.4:1 to 2.0:1 (e.g., from 1.0:1 to 1.6:1). In some examples, the activator is provided as an aqueous solution in a concentration of from 10% to 50% based on the weight of the solution.

The details of one or more embodiments are set forth in the description below and in the drawing. Other features, objects, and advantages will be apparent from the description, the drawing, and from the claims.

BRIEF DESCRIPTION OF DRAWING

FIG. 1 is a graph illustrating the compressive strengths of inorganic polymer compositions containing fly ash and with and without calcium sulfoaluminate cement.

DETAILED DESCRIPTION

Inorganic polymer compositions and methods for their preparation are described herein. The compositions include the reaction product of a reactive powder, an activator, and optionally a retardant. The reactive powder includes fly ash, calcium sulfoaluminate cement, and less than 10% by weight portland cement.

The reactive powder is a reactant used to form the inorganic polymer compositions described herein. The reactive powder for use in the reactions includes fly ash. Fly ash is produced from the combustion of pulverized coal in electrical power generating plants. Fly ash produced by coal-fueled power plants is suitable for use in reactive powder described herein. The fly ash can include Class C fly ash, Class F fly ash, or a mixture thereof. As such, the calcium content of the fly ash can vary. In exemplary compositions, the fly ash included in the reactive powder can have a calcium content, expressed as the oxide form (i.e., calcium oxide), of from 18% to 35% by weight. In some examples, the calcium oxide content of the fly ash is from 23% to 30% by weight.

In some examples, the majority of the fly ash present is Class C fly ash (i.e., greater than 50% of the fly ash present is Class C fly ash). In some examples, greater than 75%, greater than 85%, or greater than 95% of the fly ash present is Class C fly ash. For example, greater than 75%, greater than 76%, greater than 77%, greater than 78%, greater than 79%, greater than 80%, greater than 81%, greater than 82%, greater than 83%, greater than 84%, greater than 85%, greater than 86%, greater than 87%, greater than 88%, greater than 89%, greater than 90%, greater than 91%, greater than 92%, greater than 93%, greater than 94%, greater than 95%, greater than 96%, greater than 97%, greater than 98%, or greater than 99% of the fly ash present is Class C fly ash. In some embodiments, only Class C fly ash is used. In some embodiments, blends of Class C fly ash and Class F fly ash can be used, particularly if the overall CaO content is as discussed above.

The fly ash used in the reactive powder can be a fine fly ash. The use of a fine fly ash provides a higher surface area. As used herein, fine fly ash refers to fly ash having an average particle size of 25 microns or less. The average particle size for the fly ash can be from 5 microns to 25 microns, or from 10 microns to 20 microns.

Optionally, the fly ash is the principal component of the reactive powder. In some examples, the fly ash is present in an amount of greater than 85% by weight of the reactive powder, greater than 90% by weight of the reactive powder, or greater than 95% by weight of the reactive powder. For example, the fly ash can be present in an amount of greater than 85% by weight, greater than 86% by weight, greater than 87% by weight, greater than 88% by weight, greater than 89% by weight, greater than 90% by weight, greater than 91% by weight, greater than 92% by weight, greater than 93% by weight, greater than 94% by weight, greater than 95% by weight, greater than 96% by weight, greater than 97% by weight, greater than 98% by weight, or greater than 99% by weight based on the weight of the reactive powder.

As described above, the reactive powder for use as a reactant to form the inorganic polymer compositions further includes calcium sulfoaluminate cement. Calcium sulfoaluminate cement includes cements containing a mixture of components, including, for example, anhydrous calcium sulfoaluminate, dicalcium silicate, and/or gypsum. Calcium sulfoaluminate cement reacts with water to form ettringite and thus contributes to the high early compressive strength of the inorganic polymers. A suitable calcium sulfoaluminate cement includes, for example, DENKA CSA (Denki Kagaku Kogyo Kabushiki Kaisha; Tokyo, Japan). In some examples, the calcium sulfoaluminate cement is present in an amount of from 0.1% to 10% based on the weight of the reactive powder. For example, the calcium sulfoaluminate cement can be present in an amount of from 0.5% to 8% by weight or from 1% to 5% by weight of the reactive powder. In some examples, the amount of calcium sulfoaluminate cement is 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% based on the weight of the reactive powder. In some examples, one or more retardants, as described below, are included in the reaction mixture containing the calcium sulfoaluminate cement.

The reactive powder for use as a reactant to form the inorganic polymer compositions can further include cementitious components, including portland cement, calcium aluminate cement, and/or slag. Optionally, portland cement can be included as a component of the reactive powder. Suitable types of portland cement include, for example, Type I ordinary portland cement (OPC), Type II OPC, Type III OPC, Type IV OPC, Type V OPC, low alkali versions of these portland cements, and mixtures of these portland cements. In these examples, less than 10% by weight of portland cement is included in the reactive powder. In some examples, the reactive powder includes 5% by weight or less, 3% by weight or less, or 1% by weight or less of portland cement. For example, the reactive powder can include portland cement in an amount of 10% or less by weight, 9% or less by weight, 8% or less by weight, 7% or less by weight, 6% or less by weight, 5% or less by weight, 4% or less by weight, 3% or less by weight, 2% or less by weight, 1% or less by weight, or 0.5% or less by weight. In some examples, the reactive powder is substantially free from portland cement. For example, the reactive powder can include less than 0.1% by weight, less than 0.01% by weight, or less than 0.001% by weight of portland cement based on the weight of the reactive powder. In some embodiments, the reactive powder includes no portland cement.

Optionally, calcium aluminate cement (i.e., high aluminate cement) can be included in the reactive powder. In some examples, the calcium aluminate cement is present in an amount of 5% or less by weight of the reactive powder. For example, the reactive powder can include calcium aluminate cement in an amount of 5% or less, 4% or less, 3% or less, 2% or less, 1% or less, 0.9% or less, 0.8% or less, 0.7% or less, 0.6% or less, 0.5% or less, 0.4% or less, 0.3% or less, 0.2% or less, or 0.1% or less by weight. In some examples, the reactive powder can include calcium aluminate cement in an amount of from 0.5% to 5%, from 1% to 4.5%, or from 2% to 4% by weight. The calcium aluminate cement can be used, in some examples, in compositions that include less than 3% hydrated or semihydrated forms of calcium sulfate (e.g., gypsum). In some examples, the reactive powder is substantially free from calcium aluminate cement or includes no calcium aluminate cement.

The reactive powder can also include a ground slag such as blast furnace slag in an amount of 10% or less by weight. For example, the reactive powder can include slag in an amount of 10% or less, 9% or less, 8% or less, 7% or less, 6% or less, 5% or less, 4% or less, 3% or less, 2% or less, or 1% or less by weight.

The reactive powder can also include calcium sources such as limestone (e.g., ground limestone), quicklime, slaked lime, or hydrated lime in an amount of 10% or less by weight of the reactive powder. For example, limestone can be present in an amount of 10% or less, 9% or less, 8% or less, 7% or less, 6% or less, 5% or less, 4% or less, 3% or less, 2% or less, or 1% or less by weight of the reactive powder.

The reactive powder can also include a tricalcium aluminate additive. As would be understood by those skilled in the art, tricalcium aluminate is present in a small amount in portland cement. The tricalcium aluminate would be present as an additive, wherein the tricalcium aluminate is not a portland cement constituent. The tricalcium aluminate additive can be present in an amount of from 0.1% to 10% by weight, or 1% to 5% of the reactive powder.

Anhydrous calcium sulfate can be optionally included as an additional reactant used to form the inorganic polymer compositions described herein. The anhydrous calcium sulfate can be present as a reactant in an amount of 0.1% by weight or greater based on the weight of the reactive powder and has been found to increase the compressive strength of the inorganic polymer products. In some examples, the anhydrous calcium sulfate can be present in an amount of from 1% to 10%, 2% to 8%, 2.5% to 7%, or 3% to 6% by weight of the reactive powder. For example, the amount of anhydrous calcium sulfate can be 0.5% or greater, 1% or greater, 1.5% or greater, 2% or greater, 2.5% or greater, 3% or greater, 3.5% or greater, 4% or greater, 4.5% or greater, or 5% or greater based on the weight of the reactive powder.

An activator is a further reactant used to form the inorganic polymer compositions described herein. The activator allows for rapid setting of the inorganic polymer compositions and also imparts compressive strength to the compositions. The activator can include one or more of acidic, basic, and/or salt components. For example, the activator can include citrates, hydroxides, metasilicates, carbonates, aluminates, sulfates, and/or tartrates. The activator can also include other multifunctional acids that are capable of complexing or chelating calcium ions (e.g., EDTA). Specific examples of suitable citrates for use as activators include citric acid and its salts, including, for example, sodium citrate and potassium citrate. Specific examples of suitable tartrates include tartaric acid and its salts (e.g., sodium tartrate and potassium tartrate). In some examples, the activator can include alkali metal hydroxides, such as sodium hydroxide and potassium hydroxide. Further examples of suitable activators include metasilicates (e.g., sodium metasilicate and potassium metasilicate); carbonates (e.g., sodium carbonate and potassium carbonate); aluminates (e.g., sodium aluminate and potassium aluminate); and sulfates (e.g., sodium sulfate and potassium sulfate). In some examples, the activator includes citric acid, tartaric acid, or mixtures thereof. In some examples, the activator includes sodium hydroxide. In some examples, the activator includes a mixture of citric acid and sodium hydroxide. In examples including a mixture of citric acid and sodium hydroxide, the weight ratio of citric acid present in the mixture to sodium hydroxide present in the mixture is from 0.4:1 to 2.0:1, 0.6:1 to 1.9:1, 0.8:1 to 1.8:1, 0.9:1 to 1.7:1, or 1.0:1 to 1.6:1. The activator components can be pre-mixed prior to being added to the other reactive components in the inorganic polymer or added separately to the other reactive components. For example, citric acid and sodium hydroxide could be combined to produce sodium citrate and the mixture can include possibly one or more of citric acid and sodium hydroxide in stoichiometric excess. In some embodiments, the activator includes a stoichiometric excess of sodium hydroxide. The total amount of activators can include less than 95% by weight of citrate salts. For example, the total amount of activator can include from 25-85%, 30-75% or 35-65% citrate salts by weight. The mixture in solution and the mixture when combined with reactive powder can have a pH of from 12 to 13.5 or about 13.

The activator can be present as a reactant in an amount of from 1.5% to 8.5% dry weight based on the weight of the reactive powder. For example, the activator can be present in an amount of from 2% to 8%, from 3% to 7%, or from 4% to 6%. In some examples, the activator can be present in an amount of 1.5%, 2%, 2.5%, 3%, 3.5%, 4%, 4.5%, 5%, 5.5%, 6%, 6.5%, 7%, 7.5%, 8% or 8.5% dry weight based on the weight of the reactive powder. For example, when sodium hydroxide and citric acid are used as the activators, the amount of sodium hydroxide used in the activator solution can be from 0.3 to 15.6, 0.5 to 10, or 0.75 to 7.5 or 1 to 5 dry parts by weight based on the weight of reactive powder and the amount of citric acid used in the activator solution can be from 0.25 to 8.5, 0.5 to 0.7, 0.75 to 0.6, or 1 to 4.5 dry parts by weight based on the weight of reactive powder. The resulting activator solution can include sodium citrate and optionally one or more of citric acid or sodium hydroxide.

The activator can be provided, for example, as a solution. In some examples, the activator can be provided in water as an aqueous solution in a concentration of from 10% to 50% or from 20% to 40% based on the weight of the solution. For example, the concentration of the activator in the aqueous solution can be from 25% to 35% or from 28% to 32% based on the weight of the solution. Examples of suitable concentrations for the activator in the aqueous solution include 10%, 15%, 20%, 25%, 30%, 35%, 40%, 45%, or 50% based on the weight of the solution.

The reactants used to form the inorganic polymer compositions can further include a retardant. Retardants are optionally included to prevent the composition from stiffening too rapidly, which can result in a reduction of strength in the structure. Examples of suitable retardants for inclusion as reactants include borax, boric acid, gypsum, phosphates, gluconates, or a mixture of these. The retardant can be provided in solution with the activator (e.g., borax or boric acid) and/or can be provided as an additive with the reactive powder (e.g., gypsum). In some examples, the retardant is present in an amount of from 0.4% to 7.5% based on the weight of the reactive powder. For example, the retardant can be present in an amount of from 0.5% to 5%, 0.6% to 3%, 0.7 to 2.5%, or 0.75% to 2.0% based on the weight of the reactive powder. In some embodiments, when gypsum is used as a retardant, it is used in an amount of 3% by weight or less based on the weight of the reactive powder. In some embodiments, borax is used as the retardant. When citric acid and sodium hydroxide are used as the activators, the weight ratio of borax to sodium hydroxide can be 0.3:1 to 1.2:1 (e.g., 0.8:1 to 1.0:1). In some examples, lower ratios of 0.3:1 to 0.8:1 can be the result of including an additional retardant such as gypsum. In some examples, the composition is substantially free from retardants or includes no retardants.

The reactants described herein can optionally include less than 3.5% by weight of additional sulfates. As would be understood by those skilled in the art, sulfates are present in the fly ash. Thus, "additional sulfates" refers to sulfates other than those provided by the fly ash. In some examples, the composition can include less than 3.5% by weight of sulfates based on the amount of reactive powder other than those provided by the fly ash. For example, the composition can include less than 3.5% by weight, less than 3% by weight, less than 2.5% by weight, less than 2% by weight, less than 1.5% by weight, less than 1% by weight, or less than 0.5% by weight of sulfates based on the amount of reactive powder other than those provided by the fly ash. In some examples, the composition is substantially free from additional sulfates. For example, the composition can include less than 0.1% by weight, less than 0.01% by weight, or less than 0.001% by weight of additional sulfates based on the amount of reactive powder. In some embodiments, the composition includes no additional sulfates.

When present, the additional sulfates can be provided in the form of gypsum (i.e., calcium sulfate dihydrate). As described above, gypsum can be present in the composition as a retardant. In some examples, the composition includes gypsum in an amount of less than 3.5% by weight based on the amount of reactive powder. For example, the composition can include gypsum in an amount of less than 3.5% by weight, less than 3% by weight, less than 2.5% by weight, less than 2% by weight, less than 1.5% by weight, less than 1% by weight, or less than 0.5% by weight.

The reactants are provided in the reactive mixture in the presence of water. The water can be provided in the reactive mixture by providing the activator and optionally the retardant in solution and/or by adding water directly to the reactive mixture. The solution to binder or solution to reactive powder weight ratio (i.e., the ratio of the solution including activator and optionally the retardant to reactive powder) can be from 0.06:1 to 0.5:1, depending on the product being made and the process being used for producing the product. The water to reactive powder (or water to binder) ratio can be from 0.06:1 to less than 0.2:1, depending on the product being made and the process being used for producing the product. In some embodiments, the water to binder ratio can be from 0.06:1 to less than 0.17:1, from 0.07:1 to less than 0.15:1, or from 0.08:1 to less than 0.14:1 (e.g., less than 0.10:1). In some embodiments, the water to binder ratio can be from 0.15:1 to less than 0.2:1, particularly when aggregate is used that absorbs a significant amount of water or solution (e.g., 20-30%). The water to binder ratio can be, for example, 0.06:1, 0.07:1, 0.08:1, 0.09:1, 0.10:1, 0.11:1, 0.12:1, 0.13:1, 0.14:1, 0.15:1, 0.16:1, 0.17:1, 0.18:1, or 0.19:1. In other examples, the water to binder ratio can be less than 0.20:1, less than 0.19:1, less than 0.18:1, less than 0.17:1, less than 0.16:1, less than 0.15:1, less than 0.14:1, less than 0.13:1, less than 0.12:1, less than 0.11:1, or less than 0.10:1.

The inorganic polymer can have a calcia to silica molar ratio of from 0.6:1 to 1.1:1. For example, the calcia to silica molar ratio can be 0.6:1, 0.7:1, 0.8:1, 0.9:1, 1.0:1 or 1.1:1.

In some examples, the composition is substantially free from alkanolamines. As used herein, alkanolamines refer to mono-, di-, and tri-alcohol amines (e.g., monoethanolamine, diethanolamine, and triethanolamine). In some examples, the composition includes no alkanolamines.

One or more aggregates or fillers can be further used in the inorganic polymer compositions described herein. In some examples, the aggregate includes lightweight aggregate. Examples of suitable lightweight aggregate includes bottom ash, expanded clay, expanded shale, expanded perlite, vermiculite, volcanic tuff, pumice, hollow ceramic spheres, hollow plastic spheres, expanded plastic beads (e.g., polystyrene beads), ground tire rubber, and mixtures of these. Further examples of suitable aggregates and fillers include other types of ash such as those produced by firing fuels including industrial gases, petroleum coke, petroleum products, municipal solid waste, paper sludge, wood, sawdust, refuse derived fuels, switchgrass, or other biomass material; ground/recycled glass (e.g., window or bottle glass); milled glass; glass spheres; glass flakes; activated carbon; calcium carbonate; aluminum trihydrate (ATH); silica; sand; alluvial sand; natural river sand; ground sand; crushed granite; crushed limestone; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; soy meal; pulverized foam; and mixtures thereof.

In some embodiments, inorganic fibers or organic fibers can be included in the inorganic polymer compositions, e.g., to provide increased strength, stiffness or toughness. In some examples, fire resistant or retardant glass fibers can be included to impart fire resistance or retarding properties to the inorganic polymer compositions. Fibers suitable for use with the inorganic polymer compositions described herein can be provided in the form of individual fibers, fabrics, rovings, or tows. Exemplary fibers include glass, polyvinyl alcohol (PVA), carbon, basalt, wollastonite, and natural (e.g., bamboo or coconut) fibers. The fibers can be included in an amount of 0.1% to 6% based on the weight of reactive powder. For example, the fibers can be included in an amount of 0.5% to 5%, 0.75% to 4%, or 1% to 3% based on the weight of reactive powder.

The inclusion of aggregate or filler in the inorganic polymer compositions described herein can modify and/or improve the chemical and mechanical properties of the compositions. For example, the optimization of various properties of the compositions allows their use in building materials and other structural applications. High aggregate and filler loading levels can be used in combination with the compositions without a substantial reduction of (and potentially an improvement in) the intrinsic structural and physical properties of the inorganic polymer compositions. Further, the use of lightweight aggregate provides lightweight building products without compromising the mechanical properties of the inorganic polymer compositions.

The aggregate or filler can be added to the composition at a weight ratio of 0.5:1 to 4.0:1 based on the weight of reactive powder (i.e., aggregate to binder weight ratio). In some embodiments, the aggregate to binder weight ratio can be from 0.5:1 to 2.5:1 or from 1:1 to 2:1 depending on the product to be produced. In some embodiments, the aggregate to binder weight ratio can be from 1.5:1 to 4:1 or from 2:1 to 3.5:1. For example, the aggregate to binder weight ratio can be 0.5:1, 0.6:1, 0.7:1, 0.8:1, 0.9:1, 1.0:1, 1.1:1, 1.2:1, 1.3:1, 1.4:1, 1.5:1, 1.6:1, 1.7:1, 1.8:1, 1.9:1, 2.0:1, 2.1:1, 2.2:1, 2.3:1, 2.4:1, 2.5:1, 2.6:1, 2.7:1, 2.8:1, 2.9:1, 3.0:1, 3.1:1, 3.2:1, 3.3:1, 3.4:1, 3.5:1, 3.6:1, 3.7:1, 3.8:1, 3.9:1, or 4.0:1.

Additional components useful with the compositions described herein include water reducers, plasticizers, pigments, foaming or blowing agents, anti-efflorescence agents, photocatalysts, ultraviolet light stabilizers, fire retardants, antimicrobials, and antioxidants.

Water reducers can be included in the compositions described herein to reduce the amount of water in the composition while maintaining the workability, fluidity, and/or plasticity of the composition. In some examples, the water reducer is a high-range water reducer, such as, for example, a superplasticizer admixture. Examples of suitable water reducers include lignin, naphthalene, melamine, polycarboxylates, lignosulfates and formaldehyde condensates (e.g., sodium naphthalene sulfonate formaldehyde condensate). Water reducers can be provided in an amount of from greater than 0 to 1% by weight based on the weight of reactive powder.

Plasticizers can also be included in the compositions described herein. Plasticizers enhance the extrudability of the inorganic polymer compositions. Examples of suitable plasticizers for use with the compositions described herein include clays (e.g., bentonite, expanded clay, and kaolin clay) and polymers (e.g., JEFFSPERSE X3202, JEFFSPERSE X3202RF, and JEFFSPERSE X3204, each commercially available from Huntsman Polyurethanes; Geismar, La.).

Pigments or dyes can optionally be added to the compositions described herein. An example of a pigment is iron oxide, which can be added in amounts ranging from 1 wt % to 7 wt % or 2 wt % to 6 wt %, based on the weight of reactive powder.

Air-entraining and/or blowing agents can be added to the compositions described herein to produce a foamed composition. Air-entraining agents can be used to help the system maintain air or other gases, e.g., from the mixing process. Examples of suitable air-entraining agents include sodium alkyl ether sulfate, ammonium alkyl ether sulfate, sodium alpha olefin sulfonate, sodium deceth sulfate, ammonium deceth sulfate, sodium laureth sulfate, and sodium dodecylbenzene sulfonate. Blowing agents can be included in the compositions to produce a gas and generate a foamed composition. Examples of suitable blowing agents include aluminum powder, sodium perborate, and $H_2O_2$. The air entraining agents and/or blowing agents can be provided in an amount of 0.1% or less based on the weight of the reactive powder.

Anti-efflorescence agents can be included in the compositions to limit the transport of water through the structure and thus limit the unbound salts that are brought to the surface of the structure thereby limiting the aesthetic properties of the structure. Suitable anti-efflorescence agents include siloxanes, silanes, stearates, amines, fatty acids (e.g., oleic acid and linoleic acid), organic sealants (e.g., polyurethanes or acrylics), and inorganic sealants (e.g., polysilicates). Anti-efflorescence agents can be included in the compositions in an amount of from 0.01 wt % to about 1 wt % based on the weight of the reactive powder.

Photocatalysts such as anatase (titanium dioxide) can be used that produce superoxidants that can oxidize $NO_x$ and VOC's to reduce pollution. The photocatalysts can make the system super hydrophobic and self-cleaning (e.g., in the presence of smog). These materials can also act as antimicrobials and have impact on algae, mold, and/or mildew growth.

Ultraviolet light stabilizers, such as UV absorbers, can be added to the compositions described herein. Examples of UV light stabilizers include hindered amine type stabilizers and opaque pigments like carbon black powder. Fire retardants can be included to increase the flame or fire resistance of the compositions. Antimicrobials such as copper complexes can be used to limit the growth of mildew and other organisms on the surface of the compositions. Antioxidants, such as phenolic antioxidants, can also be added. Antioxidants can provide increased UV protection, as well as thermal oxidation protection.

A method of producing an inorganic polymer composition is also described herein. The method includes mixing reactants comprising a reactive powder, an activator, and optionally a retardant in the presence of water. As described above, the reactive powder comprises fly ash, calcium sulfoaluminate cement, and less than 10% by weight portland cement. The composition can be substantially free from alkanolamines. The components can be mixed from 2 seconds to 5 minutes. In some examples, the reactants are mixed for a period of 15 seconds or less (e.g., 2 to 10 or 4 to 10 seconds). The mixing times, even in the order of 15 seconds or less, result in a homogenous mixture. The mixing can be performed at an elevated temperature (e.g., up to 160° F.) or at ambient temperature. In some embodiments, the mixing occurs at ambient temperature. The reactants are allowed to react to form the inorganic polymer composition.

The compositions can be produced using a batch, semi-batch, or continuous process. At least a portion of the mixing step, reacting step, or both, can be conducted in a mixing apparatus such as a high speed mixer or an extruder. The method can further include the step of extruding the resulting composition through a die or nozzle. In examples where the activator includes more than one component, the components can be pre-mixed prior to reacting with the reactive powder and optionally the retardant, as noted above. In some embodiments, a mixing step of the method used to prepare the compositions described herein includes: (1) combining the activators in either solid form or aqueous solution (e.g., combining an aqueous solution of citric acid with an aqueous solution of sodium hydroxide) and adding any additional water to provide a desired concentration for the activator solution; and (2) mixing the activator solution with the reactive powder and aggregate. After mixing the components for less than 15 seconds, the composition can be placed in a shaping mold and allowed to cure. For example, the composition can be allowed to cure in individual molds or it can be allowed to cure in a continuous forming system such as a belt molding system. In some embodiments, the reactive mixture is wet cast to produce the product. The composition can have a set time in the mold, for example, of from 1 to 300 minutes and can be less than 5 minutes (e.g., 2-5 minutes).

An ultrasonic or vibrating device can be used for enhanced mixing and/or wetting of the various components of the compositions described herein. Such enhanced mixing and/or wetting can allow a high concentration of reactive powder to be mixed with the other reactants. The ultrasonic or vibrating device produces an ultrasound of a certain frequency that can be varied during the mixing and/or extrusion process. Alternatively, a mechanical vibrating device can be used. The ultrasonic or vibrating device useful in the preparation of compositions described herein can be attached to or adjacent to an extruder and/or mixer. For example, the ultrasonic or vibrating device can be attached to a die or nozzle or to the exit port of an extruder or mixer. An ultrasonic or vibrating device may provide de-aeration of undesired gas bubbles and better mixing for the other components, such as blowing agents, plasticizers, and pigments.

The inorganic polymer compositions described herein can be formed into shaped articles and used in various applications including building materials. Examples of such building materials include roofing tiles (e.g., shake and slate tile), ceramic tiles, synthetic stone, architectural stone, thin bricks, bricks, pavers, panels, underlay (e.g., bathroom underlay), banisters, lintels, pipe, posts, signs, guard rails, retaining walls, park benches, tables, railroad ties and other shaped articles.

The examples below are intended to further illustrate certain aspects of the methods and compositions described herein, and are not intended to limit the scope of the claims. Parts and percentages are provided on a weight basis herein, unless indicated otherwise.

EXAMPLES

Examples of inorganic polymer compositions as described herein were prepared by combining a reactive powder, an activator, and aggregate. The compositions for Comparative Example 1 and Example 1 are provided in Table 1 below.

TABLE 1

| Material (parts by weight) | Comparative Example 1 | Example 1 |
|---|---|---|
| Class C Fly Ash | 100.0 | 98.9 |
| DENKA (calcium sulfoaluminate cement) | 0.0 | 1.1 |
| Sodium Hydroxide | 0.9 | 0.9 |
| Citric Acid | 1.3 | 1.3 |
| Borax | 1.0 | 1.0 |
| Water | 27.5 | 27.5 |
| Sand | 300 | 300 |
| Compressive Strength (4 hours, psi)* | 624 | 1175 |
| Compressive Strength (1 day, psi)* | 1711 | 2335 |
| Compressive Strength (7 days, psi)* | 5845 | 6512 |

*Compressive strength is measured using a 2 inch by 2 inch cube.

In Comparative Example 1 (Table 1), the reactive powder included Class C fly ash. In Example 1 (Table 1), the reactive powder included Class C fly ash and DENKA calcium sulfoaluminate cement. The activator included citric acid and sodium hydroxide, which were combined prior to mixing with the other components. The retarder was borax and sand was used as the aggregate. The components were mixed for 10 seconds at ambient temperature, fed into molds, and allowed to cure. The compressive strengths of the inorganic polymers were measured, using a 2 inch by 2 inch cube, at time points of 4 hours and 1 day. The results are shown in FIG. 1.

The compositions, materials, and methods of the appended claims are not limited in scope by the specific compositions, materials, and methods described herein, which are intended as illustrations of a few aspects of the claims and any compositions, materials, and methods that are functionally equivalent are intended to fall within the scope of the claims. Various modifications of the compositions, materials, and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. An inorganic polymer composition, comprising a reaction product of:
   reactive powder comprising fly ash, calcium sulfoaluminate cement, and less than 10% by weight portland cement; and
   an activator;
   wherein the composition is free from alkanolamines.

2. The composition of claim 1, wherein the calcium sulfoaluminate cement is present in an amount of from 1% to 5% by weight of the reactive powder.

3. The composition of claim 1, wherein the fly ash is present in an amount of greater than 95% by weight of the reactive powder.

4. The composition of claim 1, wherein greater than 75% of the fly ash comprises Class C fly ash.

5. The composition of claim 1, wherein greater than 95% of the fly ash comprises Class C fly ash.

6. The composition of claim 1, wherein the activator includes citric acid.

7. The composition of claim 1, wherein the activator includes sodium hydroxide.

8. The composition of claim 1, wherein the retardant includes borax, boric acid, gypsum, phosphates, gluconates, or a mixture thereof.

9. The composition of claim 1, wherein the reactive powder further comprises calcium aluminate cement.

10. The composition of claim 1, further comprising aggregate.

11. The composition of claim 10, wherein the aggregate includes lightweight aggregate selected from the group consisting of bottom ash, expanded clay, expanded shale, expanded perlite, vermiculite, volcanic tuff, pumice, hollow ceramic spheres, hollow plastic spheres, expanded plastic beads, ground tire rubber, and mixtures thereof.

12. The composition of claim 1, wherein the composition is free from retardants.

13. A method of producing an inorganic polymer composition, comprising:
    mixing reactants comprising a reactive powder, and an activator in the presence of water, wherein the reactive powder comprises fly ash, calcium sulfoaluminate cement, and less than 10% by weight portland cement, and wherein the composition is free from alkanolamines; and
    allowing the reactants to react to form the inorganic polymer composition.

14. The method of claim 13, wherein the reactants are mixed for a period of 15 seconds or less.

15. The method of claim 13, wherein the mixing is performed at ambient temperature.

16. The method of claim 13, wherein the activator includes citric acid and sodium hydroxide.

17. The method of claim 16, wherein the citric acid and sodium hydroxide are combined prior to mixing with the reactants.

18. The method of claim 16, wherein the weight ratio of citric acid to sodium hydroxide is from 0.4:1 to 2.0:1.

19. The method of claim 16, wherein the weight ratio of citric acid to sodium hydroxide is from 1.0:1 to 1.6:1.

20. The composition of claim 1, wherein the activator is selected from the group consisting of citrates, hydroxides, metasilicates, carbonates, aluminates, sulfates, tartrates, and mixtures thereof.

21. The composition of claim 1, wherein the composition has a pH of from 12 to 13.5.

22. The composition of claim 1, wherein the reactive powder includes no portland cement.

23. The method of claim 13, wherein the activator is selected from the group consisting of citrates, hydroxides, metasilicates, carbonates, aluminates, sulfates, tartrates, and mixtures thereof.

24. The method of claim 13, wherein the composition has a pH of from 12 to 13.5.

25. The method of claim 13, wherein the reactive powder includes no portland cement.

26. The composition of claim 1, further comprising water.

27. The composition of claim 1, wherein the reactive powder comprises 85% or greater fly ash, by weight of the reactive powder.

28. The method of claim 13, wherein the reactive powder comprises 85% or greater fly ash, by weight of the reactive powder.

29. The composition of claim 26, wherein the ratio of water to reactive powder is 0.06:1 to less than 0.2:1.

30. The composition of claim 29, wherein the ratio of water to reactive powder is from 0.06:1 to less than 0.17:1.

31. The composition of claim 30, wherein the ratio of water to reactive powder is from 0.06:1 to less than 0.15:1.

32. The composition of claim 31, wherein the ratio of water to reactive powder is from 0.06:1 to less than 0.14:1.

* * * * *